(12) United States Patent
Woehler et al.

(10) Patent No.: US 8,027,252 B2
(45) Date of Patent: Sep. 27, 2011

(54) SYSTEM AND METHOD OF DEFENSE AGAINST DENIAL OF SERVICE OF ATTACKS

(75) Inventors: Ralf Woehler, Dallas, TX (US); Wayne Robert Sankey, Dallas, TX (US)

(73) Assignee: ADVA AG Optical Networking, Munchin (DE)

( * ) Notice: Subject to any disclaimer, the term of this patent is extended or adjusted under 35 U.S.C. 154(b) by 305 days.

(21) Appl. No.: 12/041,476

(22) Filed: Mar. 3, 2008

(65) Prior Publication Data

US 2008/0212469 A1 Sep. 4, 2008

Related U.S. Application Data

(60) Provisional application No. 60/892,564, filed on Mar. 2, 2007.

(51) Int. Cl.
*H04L 12/26* (2006.01)
(52) U.S. Cl. ........... 370/230; 370/412; 709/240; 710/40
(58) Field of Classification Search ........................ None
See application file for complete search history.

(56) References Cited

U.S. PATENT DOCUMENTS

| | | |
|---|---|---|
| 5,946,679 A | 8/1999 | Ahuja et al. |
| 6,011,798 A | 1/2000 | McAlpine |
| 6,560,230 B1 | 5/2003 | Li et al. |
| 6,771,653 B1 | 8/2004 | Le Pennec et al. |
| 6,791,990 B1 * | 9/2004 | Collins et al. ................. 370/412 |
| 6,901,050 B1 | 5/2005 | Acharya |
| 6,925,055 B1 | 8/2005 | Erimli et al. |
| 6,944,172 B2 | 9/2005 | Sankey et al. |
| 7,006,440 B2 | 2/2006 | Agrawal et al. |
| 7,447,212 B2 | 11/2008 | Hu |
| 2006/0146721 A1 * | 7/2006 | Attar et al. ..................... 370/238 |
| 2006/0187949 A1 | 8/2006 | Seshan et al. |
| 2006/0187965 A1 * | 8/2006 | Lee et al. ...................... 370/474 |
| 2007/0104095 A1 * | 5/2007 | Kuhl et al. .................... 370/229 |
| 2007/0195793 A1 | 8/2007 | Grosser et al. |
| 2007/0299987 A1 | 12/2007 | Parker et al. |

* cited by examiner

*Primary Examiner* — Ayaz Sheikh
*Assistant Examiner* — Nicholas Sloms
(74) *Attorney, Agent, or Firm* — Haynes and Boone, LLP

(57) ABSTRACT

A system and method comprise a first buffer having a first capacity and a first threshold level adapted to store data frames having the lowest priority, a second buffer having a second capacity greater than the first capacity and a second threshold level greater than the first threshold level adapted to store data frames having a medium priority, a third buffer having a third capacity greater than the second capacity and a third threshold level greater than the second threshold level adapted to store data frames having the highest priority. The system further includes means for differentiating a data frame as having lowest, medium or highest priority and storing the data frame in the respective first, second or third buffer, and discarding the data frame in response to the first, second or third buffer reaching the respective threshold level.

17 Claims, 3 Drawing Sheets

SYSTEM AND METHOD OF DEFENSE AGAINST DENIAL OF SERVICE OF ATTACKS

CROSS-REFERENCE

This patent application claims the benefit of U.S. Provisional Patent Application Ser. No. 60/892,564, filed on Mar. 2, 2007.

This application is related to U.S. patent application Ser. No. 11/681,606 filed on Mar. 2, 2007, and entitled "System and Method for Aggregated Shaping of Multiple Prioritized Classes of Service Flows," U.S. patent application Ser. No. 11/681,647 filed on Mar. 2, 2007, and entitled "System and Method For Constrained Machine Address Learning," and U.S. patent application Ser. No. 12/041,452 filed on Mar. 3, 2008, and entitled "System and Method for Line Rate Frame Processing Engine Using a Generic Instruction Set." These applications are hereby incorporated by reference in their entirety.

BACKGROUND

Denial of service attacks are disruptive attempts on a computer system so that its resources become unavailable to its users. In one type of a denial of service attack, a computer server or network is flooded with illegitimate data traffic that overwhelms the capacity of its bandwidth and computation resources. As a result, data traffic are dropped and management and control traffic of the computer network are blocked.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
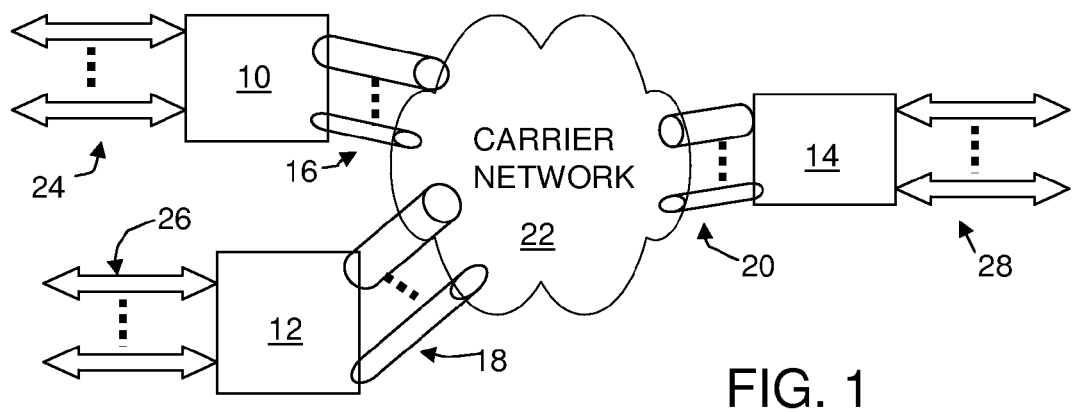
FIG. 1 is a simplified block diagram of a plurality of access gateways to local area networks each having a plurality of Ethernet virtual circuits of various bandwidths transmitting and receiving data packets over a carrier network.

FIG. 1 is a simplified block diagram of a plurality of network equipment 10-14, such as access gateways, coupled between local area networks (LANs) or virtual LANs (VLANs) and to Ethernet virtual circuits (EVCs) 16-20 of various bandwidths over a carrier network 22, such as a wide area network (WAN). Network equipment 10-14 are operable to provide aggregated shaping of multiple prioritized classes of service (CoS) flows 24-28. Preferably, the access gateways support the IEEE 802.1ad, 802.1ag, 802.1d, 802.1q, 802.3ah, and other applicable standards. Hereinafter, the terms local area network and LAN may be used to refer to a computer network that is more localized in nature to connect computers that are co-located or situated at one site. The terms wide area network and WAN may be used to refer to a computer network that spans a relatively large geographical area, and may comprise two or more local area networks.

Figure 2:
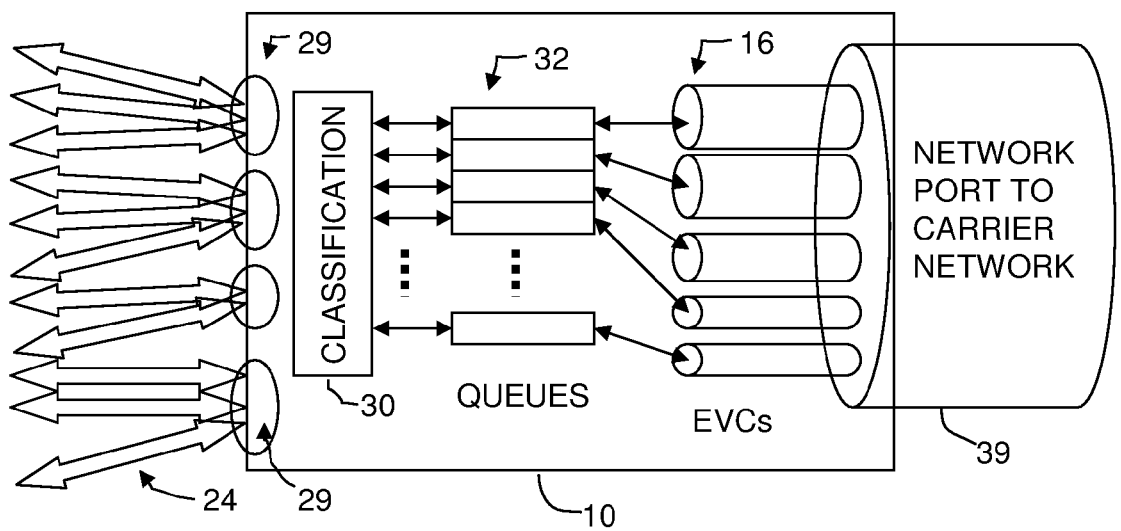
FIG. 2 is a simplified block diagram of an embodiment of an access gateway operable to provide aggregated shaping of multiple prioritized classes of service flows.

FIG. 2 is a simplified block diagram of an embodiment of a network equipment or an access gateway 10. Access gateway 10 is coupled to a plurality of customer ports 29 to receive and transmit a plurality of service flows 24. The traffic in the service flows may include VoIP, video, and other data traffic that have different bandwidth, latency and jitter requirements. A customer Ethernet virtual circuit (EVC) connection is identified by a unique X-tag at a customer port 29. The data frames in the service flows 24 arriving on the customer ports 29 are sorted and classified by a classification module 30 and forwarded in CoS flows to other processing modules, including a plurality of queues 32 that perform buffering and shaping. The queues are further grouped and prioritized to form QoS queues to enable aggregated scheduling of the grouped queues subject to one another. As a result, groups of queues 32 related by network port EVC or output LAN port are scheduled subject to each other. The groups have strict priority for determining frame egress ordering subject to the availability of tokens. Data packets are removed from the queues 32 (dequeued) and transmitted over a plurality of Ethernet virtual circuits 16 out to the carrier network 22 via a network port 39 according to certain parameters of the service flows, such as committed information rate (CIR) and excess information rate (EIR), and the CoS for the queue. This aspect is described in more detail below. The Ethernet virtual circuits at the network port 39 is identified by a unique S and C tag combination. Any queue may be mapped to any output port and the frames from any input port may be entered into any queue.

Figure 3:
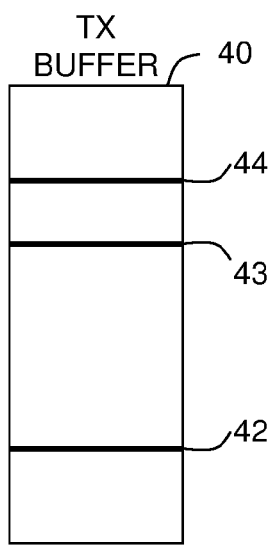
FIG. 3 is a simplified diagram illustrating the concept of using different frame class threshold fill values of a transmit buffer in the access gateway.

FIG. 3 is a simplified diagram illustrating the concept of using different frame class threshold fill values of a transmit buffer in the access gateway. FIG. 3 shows three different fill threshold values 42-44 of a transmit buffer 40 where the highest threshold value is used for the highest priority traffic. To prevent a denial of service attack from blocking important network processor communications, the transmit (TX) buffer 40 fill level-based frame forwarding concept is used. According to this concept, a specific frame of data is forwarded only if the fill level of the respective transmit buffer is below the specified threshold for the category of the frame. Therefore, a first fill threshold value 42 is specified for general broadcast frames. If the current fill level of the transmit buffer 40 is greater than this first threshold value, then the broadcast frames are discarded. A second fill threshold value 43 is also specified for non-network processor queue frames. A third fill threshold 44 value is specified for network processor queue frames. Network processor queue frames are data traffic for network management and have the highest priority. Therefore, non-network processor queue frames and network processor queue frames arriving at the access gateway are also processed according to the current fill level of the transmit buffer 40.

Figure 4:
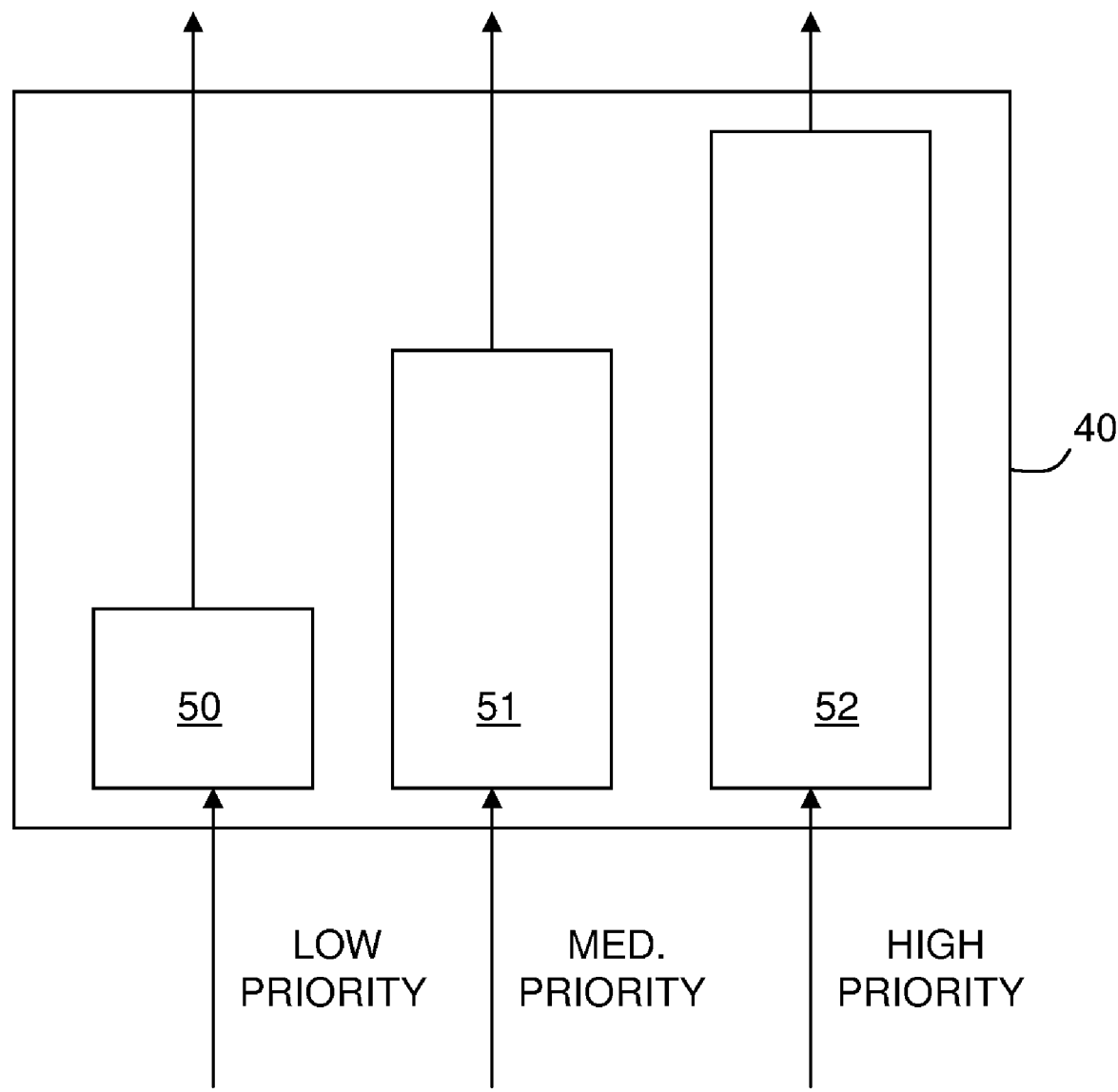
FIG. 4 is a simplified functional block diagram of an embodiment of a network management interface using frame class threshold values.

FIG. 4 is a simplified functional block diagram of an embodiment of a network management interface using frame class threshold values. Three separate buffers 50-52 are used in the transmit buffer to handle and store three data streams of different priorities—low, medium, and high. The buffer 50 of the lowest priority has the lowest capacity and the lowest threshold level and is used to en-queue broadcast frames, for example. The buffer 51 of non-network processor frames have a capacity greater than the lowest priority buffer 50 and also a higher fill threshold. Frames that are of the highest priority are en-queued in the network processor buffer 52 that has the highest capacity and the highest threshold value. Strict priority arbitration between the three streams is enforced.

In operation, frames being de-queued from a memory subsystem are differentiated into N different streams of frames. Frames are only admitted into the transmit buffer if they have been identified as belonging to one of the N streams and the respective transmit fill level has not exceeded the threshold associated with the respective stream. In any other case, the frame is not en-queued and discarded. In the embodiment shown in FIG. 3, N=3. Therefore, streams 1 and 2 are low priority streams, with stream 1 being the lowest priority and can tolerate frame loss. Stream 3 has the highest priority and is protected under all circumstances (for example, a management tunnel). Threshold values for streams 1 and 2 are discard thresholds while the threshold for the highest priority stream 3 may be a backpressure threshold towards the memory subsystem. If the high priority transmit buffer fill level exceeds this backpressure threshold value, the memory subsystem halts the frame de-queuing towards the network management interface.

Two memory subsystem queues are reserved for the network management interface, one queue contains lower priority frames (queue ID=0), while the other queue carries high priority traffic (queue ID=1). The queue for each frame is determined by a lookup table which is located before the memory subsystem. Data traffic in queue with ID=1 is preserved at all times and forwarded toward the network management interface. Traffic from queues other than 0 and 1 can also be destined toward the network management interface, but these frames are potentially suppressed inside the transmit buffer. By differentiating frames into multiple streams with different priorities (with N being the highest priority) it is guaranteed that a stream with a lower priority, such as traffic associated with a denial of service attack, is not gaining bandwidth over higher priority traffic. The queues may have a capacity ratio of 1:2:4 from lowest priority to highest priority for an three data stream implementation, for example.

Continuing with the N=3 example, the three different stream characteristics are:

Stream 1 (lowest priority): It is permissible to allow frame loss from this data stream. If a frame is a broadcast frame (e.g., MAC Destination Address is specified as 0xFFFFFFFFFFFF) and it has not been de-queued from queue 1, it is classified as a stream 1, low priority frame. The data frame is discarded if the current fill level in the transmit buffer has exceeded the broadcast threshold. If the current fill level in the transmit buffer is below the broadcast threshold, it is en-queued in the transmit buffer.

Stream 2 (medium priority): It is permissible to allow frame loss from this data stream. If a frame is not a broadcast frame, it is destined towards the network processor management interface, and it is not de-queued from either queue ID 0 or 1, it is assigned to stream 2. The frame is discarded if the current transmit buffer fill level has exceeded the discard threshold specified for stream 2, otherwise it will be en-queued.

Stream 3 (highest priority): Data frames from this stream are preserved. Two types of frames are classified as stream 3 frames.

Figure 5:
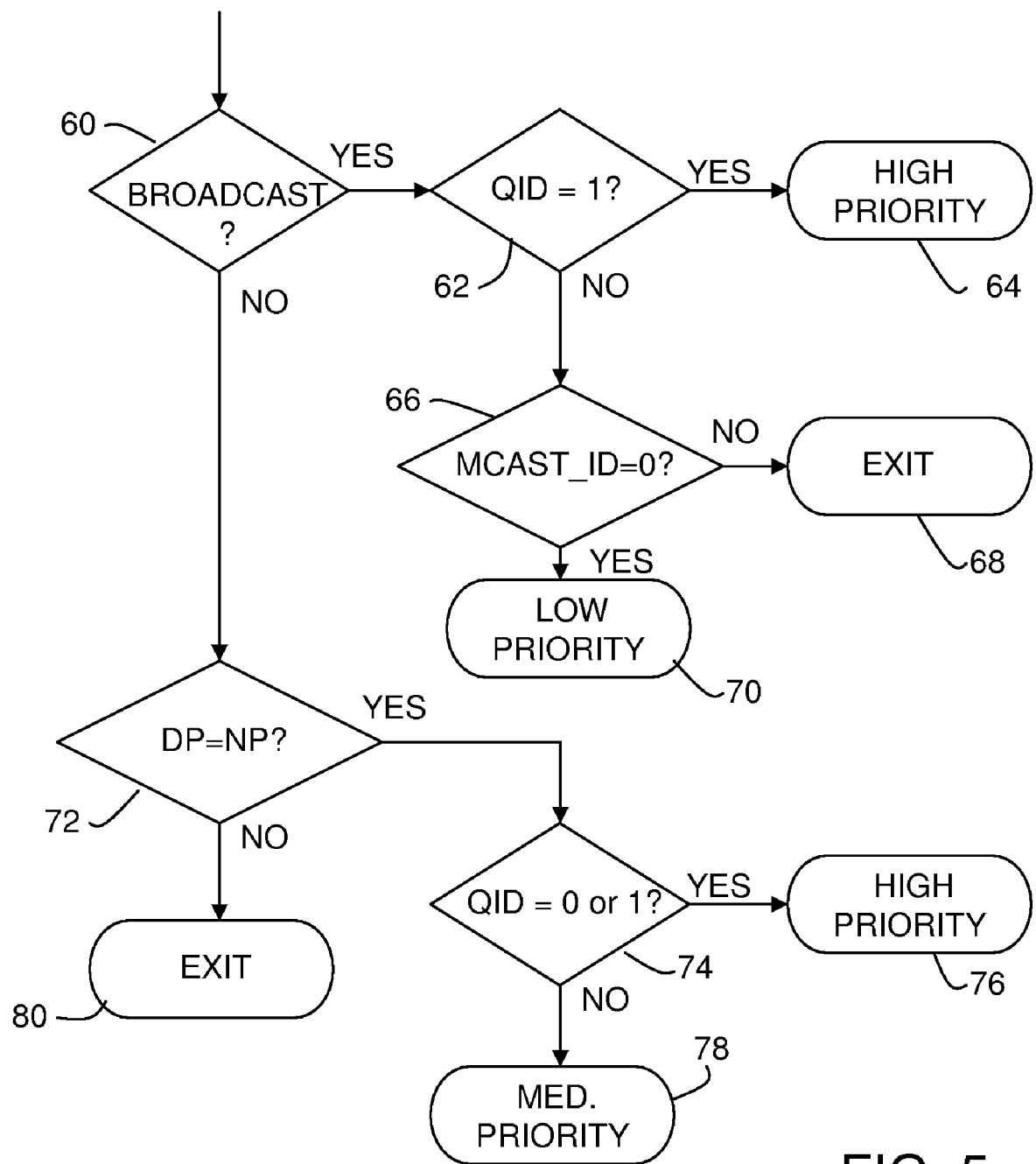
FIG. 5 is a simplified flowchart of an embodiment of a method of network management interface using frame class threshold values.

Referring to a flowchart showing an embodiment of a process of stream differentiation in FIG. 5:

If a frame is a broadcast frame, as determined in block 60, a further decision is made to determine whether the frame is a routing protocol frame, which should receive high priority, or a general broadcast frame. If the frame has been de-queued from queue ID 1, as determined in block 62, it is a routing protocol frame and is classified as stream 3 in block 64, having the highest priority.

If a frame is a broadcast frame, but the QID is not 1, then the MCAST_ID value of the frame is examined in block 66. The MCAST_ID parameter is indicative of whether the frame is a multicast frame for MAC learning purposes. If the MCAST_ID value is not 0, then the frame is a multicast frame, and no action is taken so that the frame is not forwarded to the transmit buffer. The process exits in block 68. If the MCAST_ID is 0, then the frame is not a multicast frame and is assigned to stream 1, having the lowest priority, in block 70.

If a frame is not a broadcast frame and is destined for the network processor port (DP=NP?), as determined in block 72, then its QID is examined in block 74. If the data frame has been de-queued from queue with an ID equal to 0 or 1 (QID=0 or 1), it is also classified as a stream 3 frame, as having the highest priority, in block 76. If the QID is not 0 or 1, then the frame is assigned to stream 2, as having medium priority, in block 78. If the frame destination is not the network processor, as determined in block 72, then the process exits in block 80.

If the threshold value for stream 3 has been exceeded, a backpressure signal is asserted towards the memory subsystem to halt the de-queuing for the network management interface port. Data frames of stream 3 are not discarded in the transmit buffer unless they are causing a buffer overflow condition which, in a normal operational device, is prevented by the backpressure function.

Operating in this manner, network equipment and system resources are not consumed by low priority data traffic or overwhelmed by hostile denial of service attack traffic at the expense of important network management traffic.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A system comprising:
    a transmission buffer having a first threshold level for data frames having the lowest priority, a second threshold level greater than the first threshold level for data frames having a medium priority, and a third threshold level greater than the second threshold level for data frames having the highest priority; and
    means for differentiating a data frame as having lowest, medium or highest priority and storing the data frame in the transmission buffer in response to the respective threshold levels not being reached, and discarding the data frame in response to reaching the respective threshold levels;
    wherein storing the data frame comprises storing the data frame in a first, second or third buffer in response to the priority of the data frame and the respective threshold of the respective buffer not being exceeded, wherein differentiating the data frame comprises determining whether the data flame is a general broadcast data frame and whether the data frame is destined for a network processor, wherein when the data frame is determined to be the general broadcast frame, differentiating further comprises:

determining whether the general broadcast frame is a routing protocol frame; and storing the routing protocol frame in the third buffer having the highest threshold in response to the highest threshold not being exceeded, wherein when the general broadcast frame is determined not be the routing protocol frame differentiating further comprises:

determining an MCAST_ID value of the general broadcast frame, the MCAST ID value indicative of whether the frame is a multicast frame for MAC learning purposes;

storing the general broadcast frame in the first buffer having the lowest threshold in response to the lowest threshold not being exceeded and the MCAST_ID value being zero; and discarding the general broadcast if the MCAST_ID value is greater than zero.

2. The system of claim 1, wherein the transmission buffer comprises:

a first buffer having a first capacity and the first threshold level adapted to store data frames having the lowest priority;

a second buffer having a second capacity greater than the first capacity and the second threshold level greater than the first threshold level adapted to store data frames having a medium priority; and a third buffer having a third capacity greater than the second capacity and the third threshold level greater than the second threshold level adapted to store data frames having the highest priority.

3. The system of claim 2, wherein the first buffer is adapted to store general broadcast data frames, and the third buffer is adapted to store network management data frames and routing protocol data frames.

4. The system of claim 2, wherein the third buffer is adapted to store data frames destined for a network processor.

5. The system of claim 1, where means for differentiating a data frame comprises backpressure means for handling data frames having the highest priority in response to reaching the highest threshold value.

6. A method comprising:

receiving a data frame from a memory subsystem;

differentiating the data frame as having lowest, medium or highest priority;

storing the data frame in a transmit buffer having lowest, medium, and highest thresholds in response to the priority of the data frame and the respective threshold not being exceeded; and discarding the data frame in response to the respective threshold of the data frame being exceeded, wherein storing the data frame comprises storing the data frame in a first, second or third buffer in response to the priority of the data frame and the respective threshold of the respective buffer not being exceeded, wherein differentiating the data frame comprises determining whether the data flame is a general broadcast data frame and whether the data frame is destined for a network processor, wherein when the data frame is determined to be the general broadcast frame, differentiating further comprises:

determining whether the general broadcast frame is a routing protocol frame; and storing the routing protocol frame in the third buffer having the highest threshold in response to the highest threshold not being exceeded, wherein when the general broadcast frame is determined not be the routing protocol frame differentiating further comprises:

determining an MCAST_ID value of the general broadcast frame, the MCAST ID value indicative of whether the frame is a multicast frame for MAC learning purposes;

storing the general broadcast frame in the first buffer having the lowest threshold in response to the lowest threshold not being exceeded and the MCAST_ID value being zero; and discarding the general broadcast if the MCAST_ID value is greater than zero.

7. The method of claim 6, wherein differentiating the data frame comprises determining whether the data frame is a general broadcast data frame having the lowest priority.

8. The method of claim 6, wherein differentiating the data frame comprises determining whether the data frame is a routing protocol data frame having the highest priority.

9. The method of claim 6, wherein differentiating the data frame comprises determining whether the data frame is destined for a network processor indicating the data frame has the highest priority.

10. The method of claim 6, further comprising exerting backpressure against the memory subsystem in response to the highest threshold being reached.

11. A non transitory computer-readable medium having encoded thereon a method, comprising:

receiving a data frame from a computer network;

differentiating the data frame as having lowest, medium or highest priority;

storing the data frame in a transmit buffer having lowest, medium, and highest thresholds in response to the priority of the data frame and the respective threshold not being exceeded; and discarding the data frame in response to the respective threshold of the data frame being exceeded, wherein storing the data frame comprises storing the data frame in a first, second or third buffer in response to the priority of the data frame and the respective threshold of the respective buffer not being exceeded, wherein differentiating the data frame comprises determining whether the data flame is a general broadcast data frame and whether the data frame is destined for a network processor, wherein when the data frame is determined to be the general broadcast frame, differentiating further comprises:

determining whether the general broadcast frame is a routing protocol frame; and storing the routing protocol frame in the third buffer having the highest threshold in response to the highest threshold not being exceeded, wherein when the general broadcast frame is determined not be the routing protocol frame differentiating further comprises:

determining an MCAST_ID value of the general broadcast frame, the MCAST_ID value indicative of whether the frame is a multicast frame for MAC learning purposes;

storing the general broadcast frame in the first buffer having the lowest threshold in response to the lowest threshold not being exceeded and the MCAST_ID value being zero; and discarding the general broadcast if the MCAST_ID value is greater than zero.

12. The non-transitory computer-readable medium of claim 11, wherein storing the data frame comprises storing the data frame in a first, second or third buffer in response to the priority of the data frame and the respective threshold of the respective buffer not being exceeded.

13. The non-transitory computer-readable medium of claim 11, wherein differentiating the data frame comprises determining whether the data frame is a general broadcast data frame having the lowest priority.

14. The non-transitory computer-readable medium of claim 11, wherein differentiating the data frame comprises determining whether the data frame is a routing protocol data frame having the highest priority.

15. The non-transitory computer-readable medium of claim 11, wherein differentiating the data frame comprises determining whether the data frame is destined for a network processor indicating the data frame has the highest priority.

16. The non-transitory computer-readable medium of claim 11, further comprising exerting backpressure against the memory subsystem in response to the highest threshold being reached.

17. The method of claim 6, further comprising: storing the data frame in one of the first buffer and the second buffer in response to the respective thresholds not being exceeded and when the data frame is destined for the network processor and not the general broadcast data frame; and discarding the data frame when the data frame is not destined for the network processor and not the general broadcast data frame.

* * * * *